(12) United States Patent
Lan et al.

(10) Patent No.: US 8,766,951 B2
(45) Date of Patent: Jul. 1, 2014

(54) OPTICAL TOUCH MODULE AND OPTICAL TOUCH DISPLAY PANEL

(75) Inventors: Tung-Hsin Lan, Taipei (TW); Mu-Shan Liao, Changhua County (TW); Tien-Yung Huang, Pingtung County (TW); Feng-Shu Chang, Hsinchu County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 897 days.

(21) Appl. No.: 12/900,488

(22) Filed: Oct. 8, 2010

(65) Prior Publication Data

US 2012/0044207 A1    Feb. 23, 2012

(30) Foreign Application Priority Data

Aug. 17, 2010   (TW) ............................... 99127466 A

(51) Int. Cl.
*G06F 3/042* (2006.01)

(52) U.S. Cl.
USPC .......................................... 345/175; 345/207

(58) Field of Classification Search
USPC .................................. 345/81, 207, 173–178; 178/18.01–19.04
See application file for complete search history.

(56) References Cited

U.S. PATENT DOCUMENTS

| 4,952,766 A | * | 8/1990 | McDonald ..................... 219/706 |
| 7,940,252 B2 | * | 5/2011 | Chuang et al. ................. 345/175 |

FOREIGN PATENT DOCUMENTS

| JP | 2011048839 | * | 5/2010 | ............ G06F 3/042 |
| TW | I291237 | | 12/2007 | |
| TW | I303050 | | 11/2008 | |
| TW | 200919711 | | 5/2009 | |
| TW | 201017606 | | 5/2010 | |
| TW | 201025100 | | 7/2010 | |

OTHER PUBLICATIONS

"Office Action of Taiwan Counterpart Application", issued on Aug. 28, 2013, p. 1-p. 7.

* cited by examiner

*Primary Examiner* — Dwayne Bost
*Assistant Examiner* — Robert Michaud
(74) *Attorney, Agent, or Firm* — Jianq Chyun IP Office

(57) ABSTRACT

An optical touch module and an optical touch display panel are provided. The optical touch module includes a first photo sensor, a second photo sensor, and a signal processing unit. The first photo sensor is disposed in one of the plurality of pixels of a pixel array. A first terminal and a control terminal of the first photo sensor are coupled to a first scan line. The second photo sensor has a first terminal coupled to a second terminal of the first photo sensor and outputting a sensing voltage, a control terminal coupled to the first terminal of the second photo sensor, and a second terminal receiving a first voltage. The signal processing unit is coupled to the first terminal of the second photo sensor, so as to convert the sensing voltage to a touch signal.

14 Claims, 5 Drawing Sheets

OPTICAL TOUCH MODULE AND OPTICAL TOUCH DISPLAY PANEL

CROSS-REFERENCE TO RELATED APPLICATION

This application claims the priority benefit of Taiwan application serial no. 99127466, filed on Aug. 17, 2010. The entirety of the above-mentioned patent application is hereby incorporated by reference herein and made a part of specification.

BACKGROUND OF THE INVENTION

1. Field of the Invention

The invention relates generally to a touch module and a touch display panel, and more particularly, to an optical touch module and an optical touch display panel.

2. Description of Related Art

As information technology, wireless mobile communication, and information electric appliances rapidly develop in the recent years, the input devices for a great many information electronic products have been changed from conventional keyboards and mice to touch panels for the purposes of convenience, miniaturization, and being user-friendly. Moreover, a touch panel have been integrated with a display to form a touch panel display. Touch sensing panels can be categorized into resistance touch panels, capacitance touch panels, optical touch panels, sound wave touch panels, and electromagnetic touch panels, etc, based on differences in the sensing principles.

FIG. 1 is a schematic circuit diagram of a conventional photo sensor array. Referring to FIG. 1, FIG. 1 illustrates a photo sensor array 100 disclosed by Taiwan Patent No. 1291237, adopting an in-cell photo sensor touch panel technique, in which the photo sensor is embedded in the touch panel. The photo sensor array 100 employs a current sensing technique to monitor current changes for each of the photo sensors, thereby determining a touch position. As shown in FIG. 1, the photo sensor array 100 includes phototransistors 111, 113, 115, and 117. The phototransistors 111 and 113 are controlled to turn on by a scan signal transmitted by a scan line GL1, whereas the phototransistors 115 and 117 are controlled to turn on by a scan signal transmitted by a scan line GL2. When the phototransistor 111 is turned on, different magnitudes of a current I1 are generated by the phototransistor 111 to a data signal line DL1 according to the strength of a received light. The magnitude of the current I1 is approximately 10-20 μA. Due to the small magnitude of the current I1, an interference due to noise may be easily imposed. Therefore, after the current I1 is amplified by an amplifier module 10, an amplifier module 20 is required to perform a high frequency noise filtering. Moreover, if an optical stylus is used for the touch control, then an amplifier module 30 is required to perform a specific frequency amplification.

SUMMARY OF THE INVENTION

An aspect of the invention is directed to an optical touch module and an optical touch display panel, capable of lowering the costs of a processing unit and a circuit design, as well as enhancing a sensitivity of an analog-to-digital converter (ADC).

An embodiment of the invention provides an optical touch module adapted for a display panel having a pixel array. The optical touch module includes a first photo sensor, a second photo sensor, and a signal processing unit. The first photo sensor is disposed in one of the plurality of pixels of the pixel array. A first terminal and a control terminal of the first photo sensor are coupled to a first scan line. The second photo sensor has a first terminal coupled to a second terminal of the first photo sensor and outputting a sensing voltage, a control terminal coupled to the first terminal of the second photo sensor, and a second terminal receiving a first voltage. The signal processing unit is coupled to the first terminal of the second photo sensor, so as to convert the sensing voltage to a touch signal.

According to an embodiment of the invention, the optical touch module further includes a third photo sensor having a first terminal and a control terminal coupled to a second scan line, and a second terminal coupled to the first terminal of the second photo sensor.

According to an embodiment of the invention, the first photo sensor, the second photo sensor, and the third photo sensor are respectively a phototransistor.

According to an embodiment of the invention, the second scan line is disposed outside of the pixel array.

According to an embodiment of the invention, the signal processing unit includes a capacitor and an amplification circuit. The capacitor has a first terminal coupled to the first terminal of the second photo sensor. The amplification circuit has an input terminal coupled to a second terminal of the capacitor, and an output terminal outputting the touch signal.

According to an embodiment of the invention, the amplification circuit includes an amplifier, a first resistor, and a second resistor. The amplifier has a first input terminal, a second input terminal, and an output terminal. The output terminal of the amplifier serves as the output terminal of the amplification circuit, and the second input terminal of the amplifier receives a reference voltage. The first resistor is coupled to the second terminal of the capacitor and the first input terminal of the amplifier, and a first terminal of the first resistor serves as the input terminal of the amplification circuit. The second resistor is coupled to the first input terminal and the output terminal of the amplifier.

According to an embodiment of the invention, the first voltage is a gate low voltage.

An embodiment of the invention provides an optical touch display panel including a display panel and the afore-described optical touch module. The display panel has a pixel array.

In summary, in the optical touch module and the optical touch display panel according to embodiments of the invention, the first photo sensor performs voltage division with the second photo sensor so as to generate the sensing voltage. Since the processing of voltages is less complicated than the processing of currents, the cost for the signal processing unit can be reduced.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
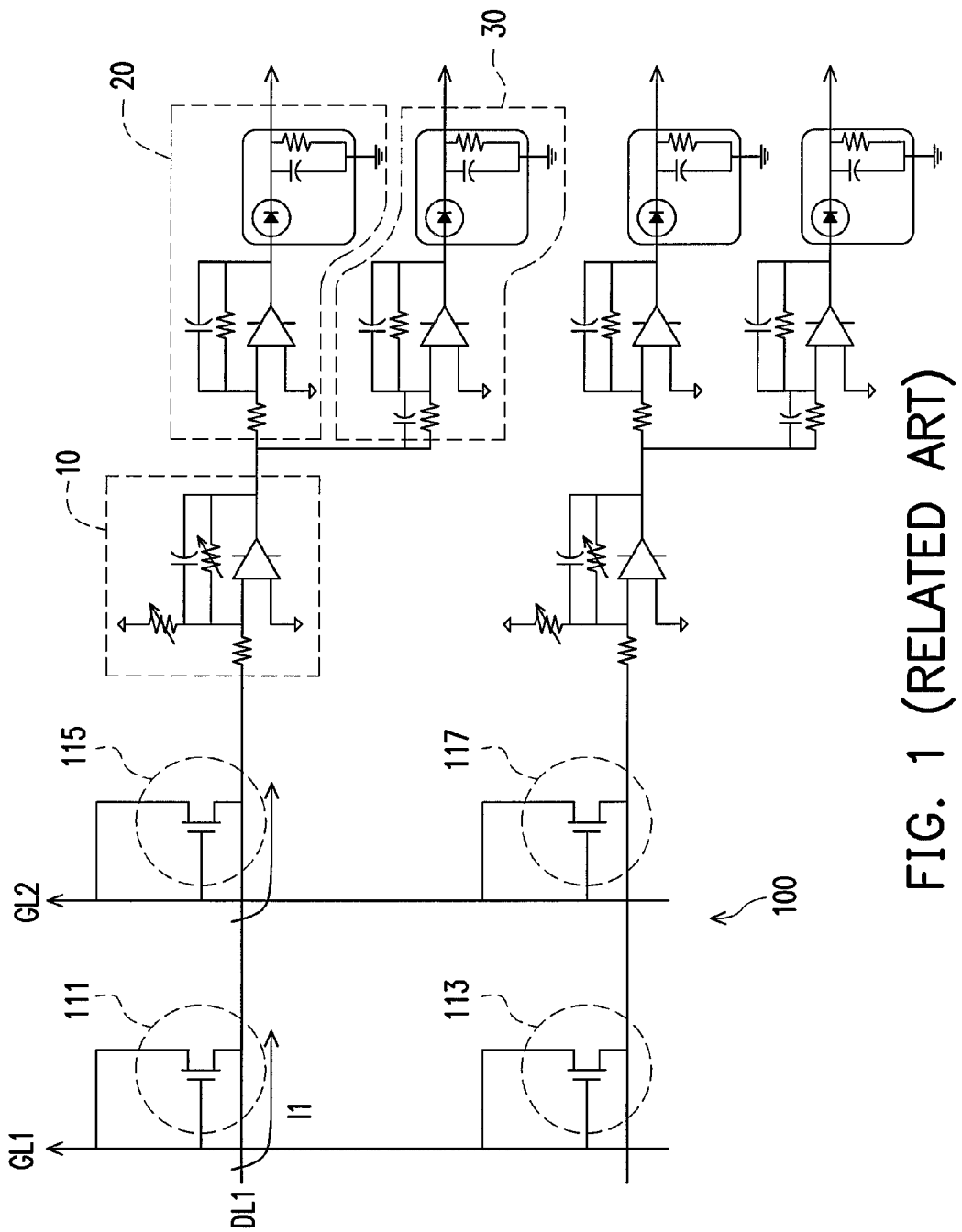
FIG. 1 is a schematic circuit diagram of a conventional photo sensor array.
Figure 2A:
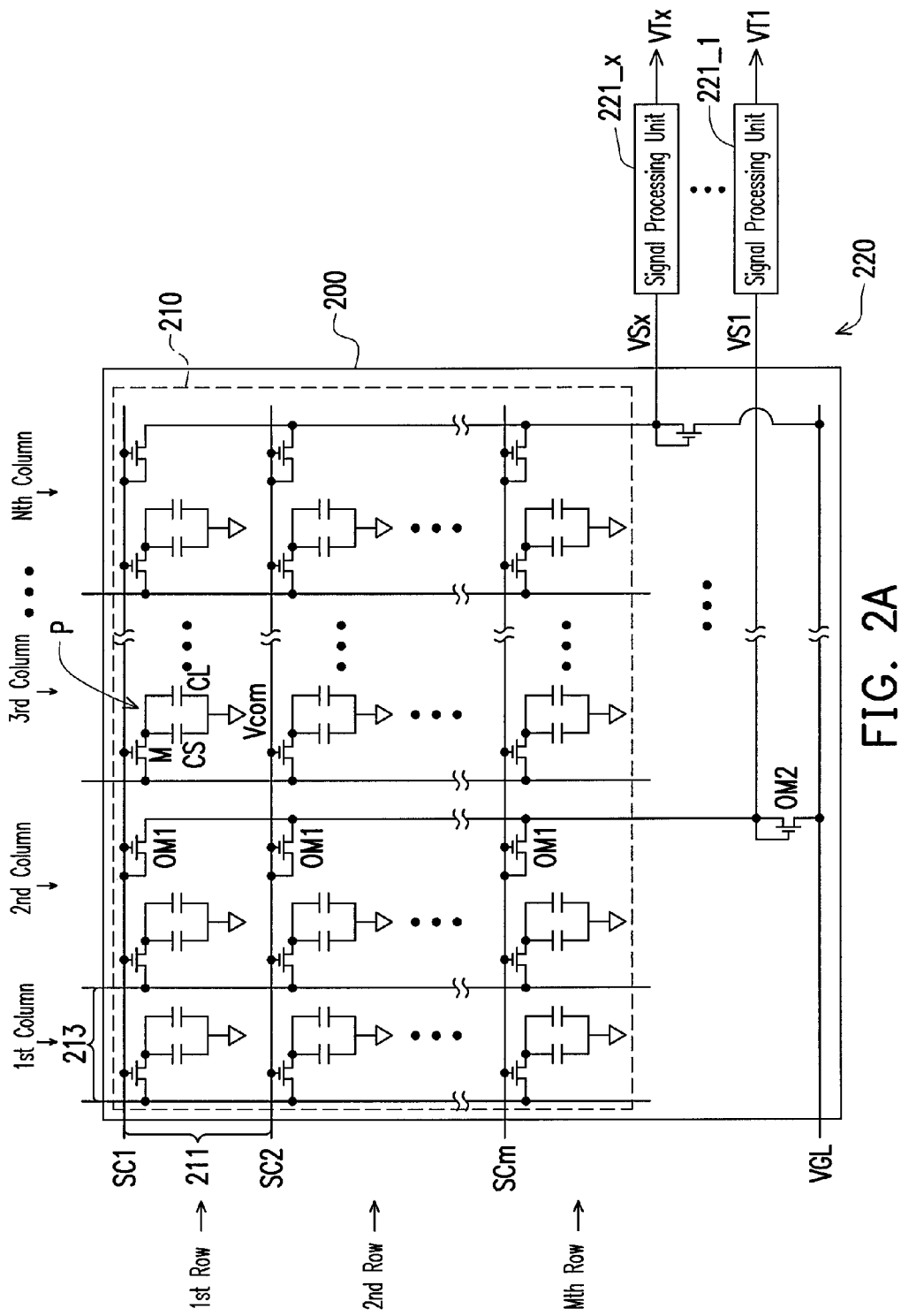
FIG. 2A is a schematic circuit diagram of an optical touch display panel according to an embodiment of the invention.

FIG. 2A is a schematic circuit diagram of an optical touch display panel according to an embodiment of the invention. Referring to FIG. 2A, an optical touch display panel 200 includes a pixel array 210, a plurality of scan lines 211, a plurality of data lines 213, and a plurality of photo sensors (e.g., phototransistors OM1 and OM2) of an optical touch module 220. The pixel array 210, the scan lines 211, and the data lines 213 can be viewed as a display panel, and the scan lines 211 and the data lines 213 are disposed in the pixel array 210. The pixel array 210 is a m×n pixel array, in which m and n are a positive integer. The scan lines 211 respectively receives a plurality of scan signals (e.g., SC1-SCm).

Each of the pixels P includes at least a transistor M, a storage capacitor CS, and a liquid crystal capacitor CL. The transistor M has a gate coupled to a corresponding scan line 211, a drain coupled to a corresponding data line 213, and a source coupled to a terminal of the storage capacitor CS and a terminal of the liquid crystal capacitor CL. Another terminal of the storage capacitor CS and another terminal of the liquid crystal capacitor CL collectively receive a common voltage Vcom. In the present embodiment, phototransistors OM1 are disposed in pixels P of even-numbered columns, in which n is an even number. However, in other embodiments, phototransistors OM1 may be disposed in each pixel, disposed in pixels of odd-numbered columns, or disposed in pixels of one column of a plurality of columns of pixels.

Using the pixel P at the first row, second column as an example, the phototransistor OM1 has a gate (e.g., control terminal) coupled to a drain thereof (e.g., first terminal), a drain coupled to a corresponding scan line 211, and a source coupled to a drain of the phototransistor OM2. In other pixels P disposed with the phototransistors OM1, the coupling manner thereof of the phototransistors OM1 is similar, therefore further description thereof is omitted hereafter. The phototransistors OM1 in pixels of a same column have sources collectively coupled to a drain of a same phototransistor OM2. The phototransistor OM2 has a drain outputting a sensing voltage (e.g., VS1 and VSx), a gate coupled to the drain thereof, and a source coupled to a gate low voltage VGL (e.g., a first voltage), in which x is an integer and corresponds to a number of columns disposed with the phototransistors OM1.

In a same column of pixels, each of the phototransistors OM1 turn on according to different scan signals. In other words, the phototransistor OM1 at the first row, second column turns on according to the scan signal SC1, whereas the phototransistor OM1 at the second row, second column turns on according to the scan signal SC2, and so on for the rest of the phototransistors OM1, in which further description thereof is omitted hereafter. Since each of the phototransistors OM1 turns on according to different scan signals, therefore only one of the phototransistors OM1 is turned on in each column.

When the phototransistor OM1 is turned on, the phototransistor OM1 is serially connected with the phototransistor OM2. Thus, the phototransistor OM1 performs voltage division with the phototransistor OM2, thereby generating the sensing voltage (e.g., VS1 and VSx). More specifically, assuming for the phototransistor OM1, a current $i_{D1}=K1(V_{GS1}-Vt)^2$, and for the phototransistor OM2, a current $i_{D2}=K2(V_{GS2}-Vt)^2$. $V_{GS1}$ refers to a voltage between the gate and source of the phototransistor OM1, K1 refers to a current coefficient of the phototransistor OM1, $V_{GS2}$ refers to a voltage between the gate and source of the phototransistor OM2, K2 refers to a current coefficient of the phototransistor OM2, and Vt is a threshold voltage of the phototransistors OM1 and OM2.

When the phototransistor OM1 is turned on, the gate thereof receives a gate high voltage VGH, the source voltage thereof equals the sensing voltage VS, and thus $V_{GS1}$=VGH−VS. The gate voltage of the phototransistor OM2 equals the sensing voltage VS, the source voltage thereof equals the gate low voltage VGL, and thus $V_{GS2}$=VS−VGL. Since the phototransistor OM1 is serially connected to the phototransistor OM2, therefore the current $i_{D1}$ of the phototransistor OM1 is equal to the current $i_{D2}$ of the phototransistor OM2, and therefore $K1(VGH-VS-Vt)^2=K2(VS-VGL-Vt)^2$.

In the embodiment, assuming the phototransistor OM2 continually receives light, the current coefficient K2 remains constant. When the phototransistor OM1 receives light, assuming at this time the current coefficient K1 is the same as the current coefficient K2, then the sensing voltage VS is equal to (VGH+VGL)/2. When the phototransistor OM1 does not receive light, assume at this time the current coefficient K1 is half the current coefficient K2, then the sensing voltage VS is equal to $$\frac{VGH + \sqrt{2}\,VGL + (\sqrt{2}-1)Vt}{\sqrt{2}+1}.$$

For example, assume the gate high voltage VGH is 24 V, the gate low voltage is −6 V, and the threshold voltage Vt is 0 V. When the phototransistor OM1 receives light, then the sensing voltage VS is approximately equal to 9 V. When the phototransistor OM1 does not receive light, then the sensing voltage VS is approximately equal to 6.4 V, or lowered by approximately 2.6 V.

When touched, the panel is surely shielded and thus cannot receive light. At this time, the phototransistor OM1 not receiving light represents the pixel P containing the phototransistor OM1 being touched, and the pixel P may be detected by the sensing voltage (e.g., VS1 and VSx). Moreover, different sensing voltages correspond to different positions on a x-axis. Further, according to the scan signals (e.g., SC1-SCm) received by the turned-on phototransistor OM1, a corresponding position on a y-axis may be determined. Moreover, whether each of the phototransistors OM1 is receiving light (e.g., being touched) may be recorded in a table, for reference to determine a touched position.

Further, the optical touch module 220 may further include signal processing units 221_1-221_x. When the pixel P is touched, the sensing voltage (e.g., VS1 and VSx) is lowered, taking a shape like a negative pulse wave. The signal processing units 221_1-221_x respectively receives the sensing voltages VS1-VSx, so as to convert the sensing voltages having the shape of negative pulse waves into touch signals VT1-VTx having the shape of positive pulse waves. Moreover, the touch signals VT1-VT2x may be converted into digital signals by an analog-to-digital converter (ADC), for reference in judgments by subsequent digital circuits.

Figure 2B:
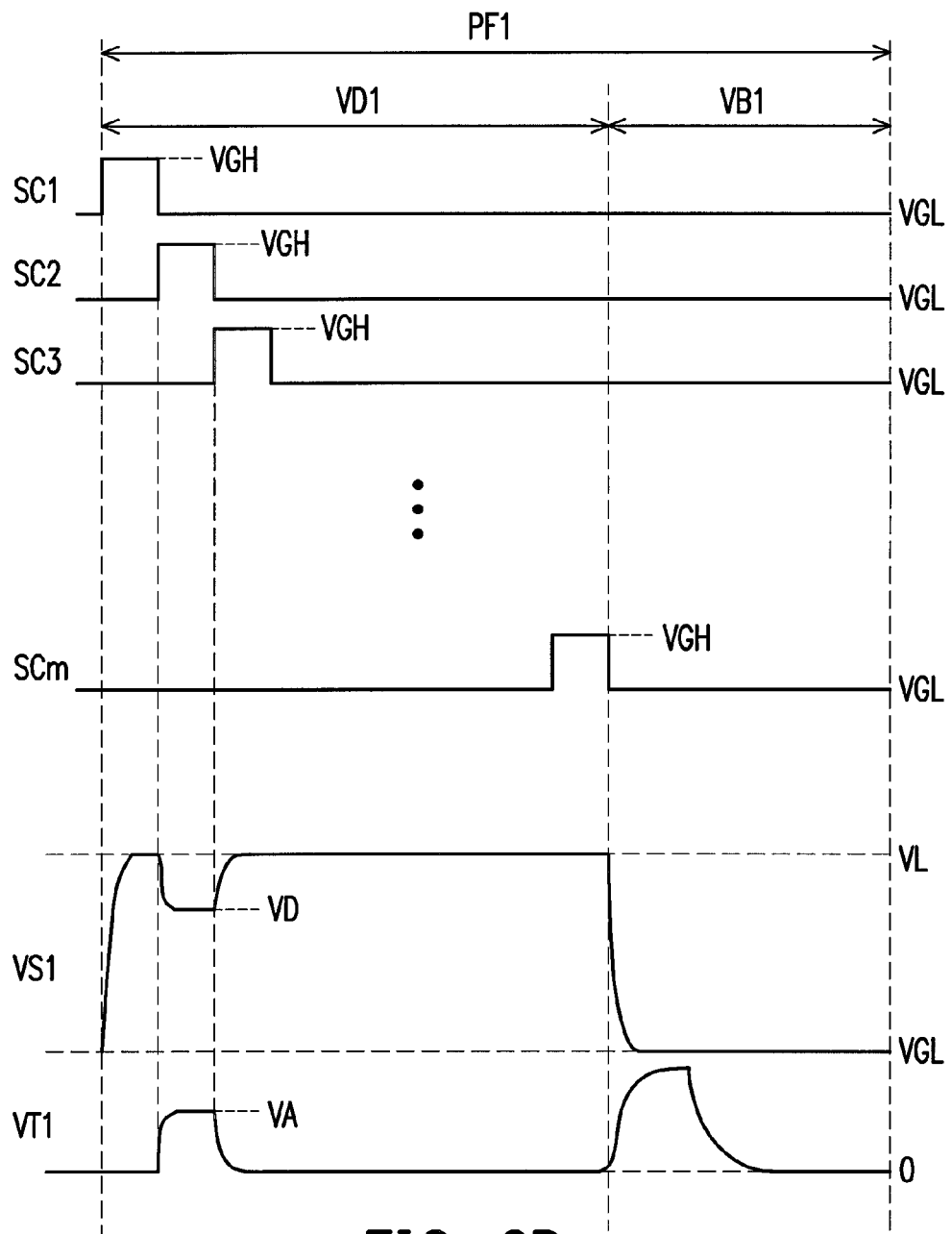
FIG. 2B is a schematic waveform diagram of the sensing voltage VS1, the touch signal VT1, and the scan signals SC1-SCm depicted in FIG. 2A according to an embodiment of the invention.

FIG. 2B is a schematic waveform diagram of the sensing voltage VS1, the touch signal VT1, and the scan signals SC1-SCm depicted in FIG. 2A according to an embodiment of the invention. Referring to FIGS. 2A and 2B, in the present embodiment, assume the pixel P at the second row, second column is touched, and the rest of the pixels on the second column have not been touched. When the scan signal SC1 is enabled (e.g., the scan signal SC1 is at the gate high voltage VGH), the phototransistor OM1 at the first row, second column performs voltage division with the phototransistor OM2 coupled therewith, such that the voltage level of the sensing voltage VS1 is at a voltage VL (e.g., (VGH+VGL)/2), and the voltage level of the touch signal VT1 is maintained at 0. When the scan signal SC2 is enabled, the phototransistor OM1 at the second row, second column performs voltage division with the phototransistor OM2 coupled therewith, such that the voltage level of the sensing voltage VS1 is lowered to a voltage $$VD\left(e.g., \frac{VGH + \sqrt{2}\,VGL + (\sqrt{2}-1)Vt}{\sqrt{2}+1}\right),$$

and the voltage level of the touch signal VT1 is increased to a voltage VA, in which VA=VL−VD.

When the scan signal SC3 is enabled, the phototransistor OM1 at the third row, second column performs voltage division with the phototransistor OM2 coupled therewith, such that the voltage level of the sensing voltage VS1 returns to the voltage VL, and the voltage level of the touch signal VT1 is returned to 0. The description above can be referenced to explain the operation when the rest of scan signals are enabled, and hence further description thereof is omitted hereafter. Accordingly, when the pixels P on the second column are shielded (e.g., being touched), then the touch signal VT1 is lowered and forms pulse waves. Thereby, the position on the x-axis is determined. Moreover, according to the enabled scan signals (e.g., SC1-SCm), the position on the y-axis may be determined. In other pixels P disposed with the phototransistors OM1, the operation thereof when the pixels P are touched is similar to the foregoing description, therefore further illustration is omitted hereafter.

Figure 2C:
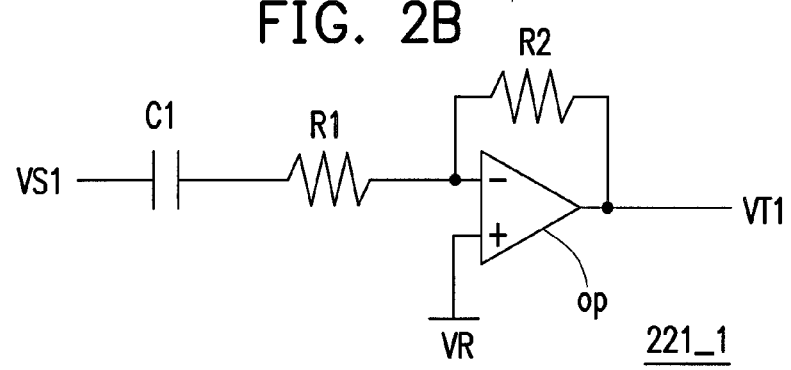
FIG. 2C is a schematic circuit diagram of the signal processing unit 221_1 depicted in FIG. 2A according to an embodiment of the invention.

FIG. 2C is a schematic circuit diagram of the signal processing unit 221_1 depicted in FIG. 2A according to an embodiment of the invention. Referring to FIG. 2C, in the present embodiment, the signal processing unit 221_1 includes an amplifier OP, a capacitor C1, a first resistor R1, and a second resistor R2. A first terminal of the capacitor C1 is coupled to the drain of the phototransistor OM2 to receive the sensing voltage VS1. The first resistor is coupled between a second terminal of the capacitor C1 and a negative input terminal (e.g., a first input terminal) of the amplifier OP. The second resistor R2 is coupled between the negative input terminal and an output terminal of the amplifier OP. A positive input terminal (e.g., a second input terminal) of the amplifier OP receives a reference voltage, in which the reference voltage may be the gate low voltage VGL or a ground voltage. The output terminal of the amplifier OP outputs the touch signal VT1.

In view of the foregoing, the combination of the amplifier OP, the first resistor R1, and the second resistor R2 may be viewed as an amplification circuit. The first terminal of the first resistor R1 serves as the input terminal of the amplification circuit, whereas the output terminal of the amplifier OP serves as the output terminal of the amplification circuit. The description above can be referenced to explain the structure of the rest of the signal processing units (e.g., 221_x), and hence further description thereof is omitted hereafter.

Referring to FIGS. 2A and 2B, in a display period VD1 of a frame period PF1, the scan signals SC1-SCm are enabled in sequence. At this time, the phototransistors OM1 on a same column are respectively turned on, so as to perform voltage division with the phototransistor OM2 coupled therewith. Therefore, the voltage level of the sensing voltage (e.g., VS1) is between the voltages VL and VD. In a vertical blanking period VB1 of the frame period PF1, the scan signals SC1-SCm are at the gate low voltage VGL. At this time, the phototransistors OM1 are all turned off, and therefore the voltage level of the sensing voltage (e.g., VS1) are at the gate low voltage VGL. According to the foregoing description, a voltage range converted by the ADC is from the voltage VL to the gate low voltage VGL. Another embodiment is illustrated below, in which the voltage range converted by the ADC is from the voltage VL to the voltage VD, and accordingly a sensitivity of the voltage conversion is enhanced.

Figure 3A:
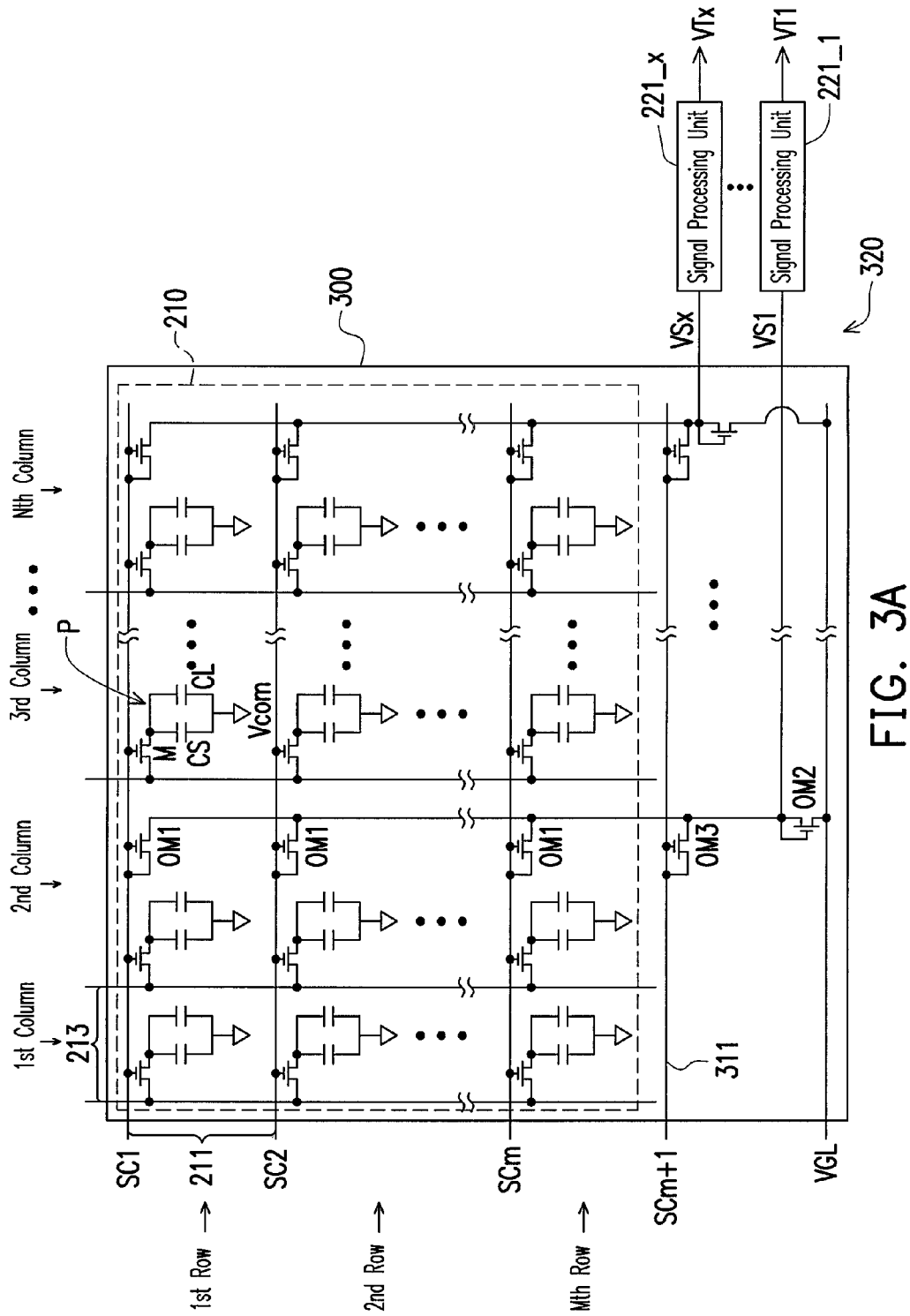
FIG. 3A is a schematic circuit diagram of an optical touch display panel according to another embodiment of the invention.

FIG. 3A is a schematic circuit diagram of an optical touch display panel according to another embodiment of the invention. Referring to FIGS. 2A to 3A, a difference therebetween is that an optical touch module 320 of an optical touch display panel 300 further includes a scan line 311 and a plurality of phototransistors OM3. The scan line 311 is disposed outside of the pixel array 210 and receives a scan signal SCm+1. The phototransistor OM3 has a drain (e.g., a first terminal) and a gate (e.g., a control terminal) coupled to the scan line 311, and a source (e.g., a second terminal) coupled to the drain of the phototransistor OM2.

Figure 3B:
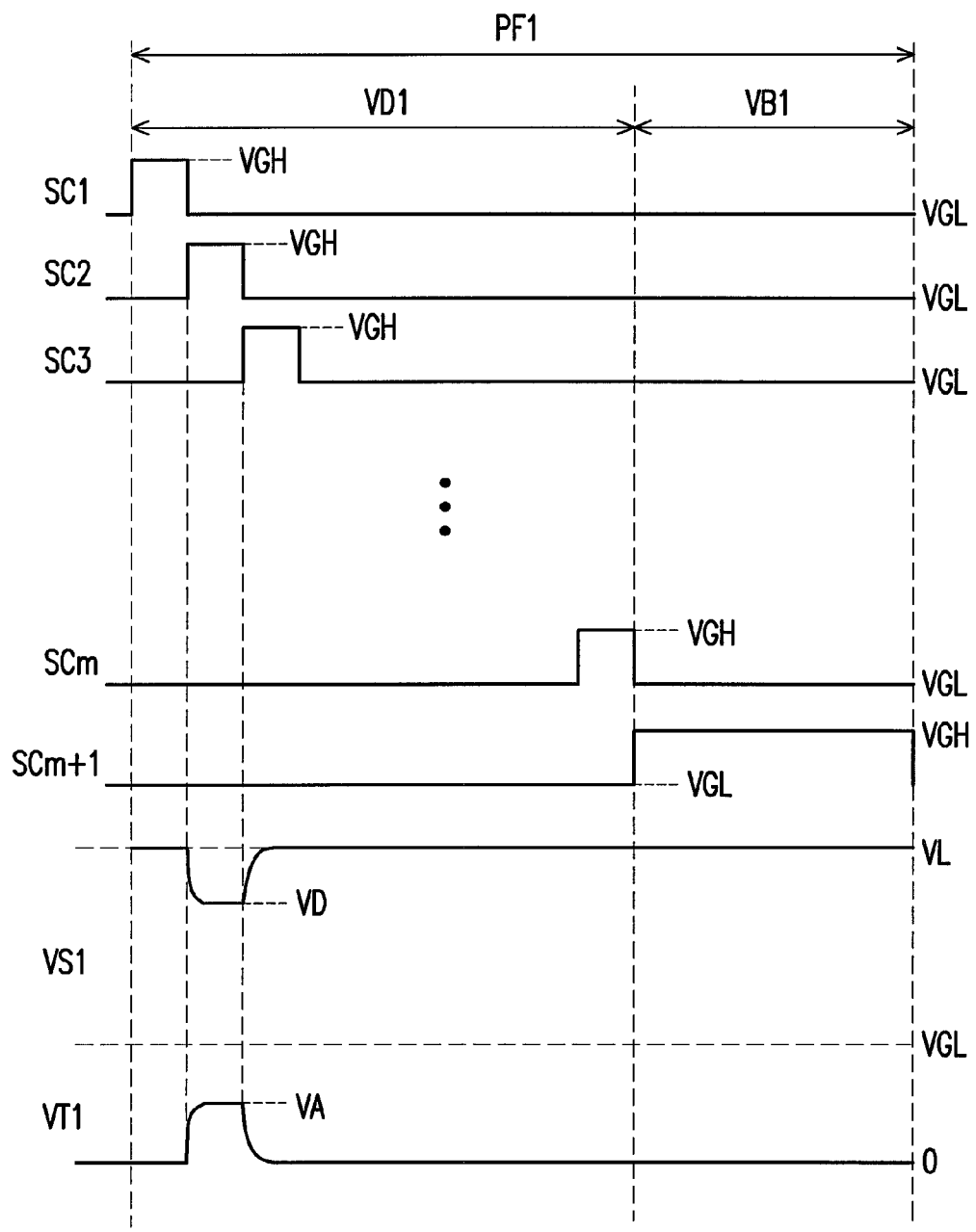
FIG. 3B is a schematic waveform diagram of the sensing voltage VS1, the touch signal VT1, and the scan signals SC1-SCm+1 depicted in FIG. 3A according to another embodiment of the invention.

FIG. 3B is a schematic waveform diagram of the sensing voltage VS1, the touch signal VT1, and the scan signals SC1-SCm+1 depicted in FIG. 3A according to another embodiment of the invention. Referring to FIGS. 3A and 3B, in the embodiment, the scan signal SCm+1 is enabled in the vertical blanking period VB1, and therefore in the vertical blanking period VB1, the phototransistor OM3 performs voltage division with the phototransistor OM2. When the electrical characteristics of the phototransistor OM3 is similar to those of the phototransistor OM1, then the range of the voltage level of the sensing voltage (e.g., VS1) is between the voltages VL and VD. Thereby, the voltage range converted by the ADC is changed to between the voltages VL to VD.

Since a voltage difference between the voltages VL to VD is smaller than a voltage difference between the voltage VL and the gate low voltage VGL, therefore the sensitivity of the voltage conversion by the ADC may be enhanced. Moreover, the scan signal SCm+1 may be provided by a timing controller, and the scan signal SCm+1 may be defined to be enabled at a falling edge of the scan signal SCm, whereas the scan signal SCm+1 is disabled at a rising edge of the scan signal SC1.

It should be noted that, the phototransistor OM2 according to the foregoing embodiments have been depicted as disposed at a lower region of the optical touch display panel. However, the invention should not be construed as limited thereto. The phototransistor OM2 may be disposed at an upper region of the optical touch display panel, so as to facilitate transmission of the sensing voltage via a source driver to the signal processing units and therefore prevent circuit crossing. Alternatively, when the signal processing units are integrated with the source driver, the source driver may directly convert the sensing voltage to the touch signal and output accordingly. Moreover, the scan line 311 and the phototransistor OM3 may also be disposed at an upper region of the optical touch display panel, in order for the scan line 311 to receive the scan signal SCm+1, and to lower a possibility that the phototransistor OM3 is shielded.

In view of the foregoing, in the optical touch module and the optical touch display panel according to embodiments of the invention, during the display period, the phototransistors OM1 in a same column are turned on sequentially so as to perform voltage division with the phototransistor OM2. Accordingly, the turned-on phototransistors OM1 perform voltage division with the phototransistor OM2 to generate the sensing voltage. Since the processing of voltages is less complicated than the processing of currents, the cost for the signal processing units can be reduced. In the vertical blanking period, the phototransistor OM3 is turned on and performs voltage division with the phototransistor OM2. Accordingly, the range of the sensing voltage is lowered, and thereby enhancing the sensitivity for the voltage conversion of the ADC. Moreover, the afore-described phototransistors OM2 and OM3, as well as the scan line 311 may be disposed in the upper region of the optical touch display panel, thereby lowering the cost of the circuit design.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An optical touch module adapted for a display panel having a pixel may, the optical touch module comprising:
    a first photo sensor disposed in one of the plurality of pixels of the pixel array, and the first photo sensor has a first terminal and a control terminal coupled to a first scan line;
    a second photo sensor having a first terminal coupled to a second terminal of the first photo sensor and outputting a sensing voltage, a control terminal coupled to the first terminal of the second photo sensor, and a second terminal receiving a first voltage, wherein the sensing voltage is the voltage divided by the first photo sensor and the second photo sensor; and
    a signal processing unit coupled to the first terminal of the second photo sensor for converting the sensing voltage to a touch signal.

2. The optical touch module as claimed in claim 1, further comprising a third photo sensor having a first terminal and a control terminal coupled to a second scan line, and a second terminal coupled to the first terminal of the second photo sensor.

3. The optical touch module as claimed in claim 2, wherein the first photo sensor, the second photo sensor, and the third photo sensor are respectively a phototransistor.

4. The optical touch module as claimed in claim 2, wherein the second scan line is disposed outside of the pixel array.

5. The optical touch module as claimed in claim 1, wherein the signal processing unit comprises:
    a capacitor having a first terminal coupled to the first teiiiiinal of the second photo sensor; and
    an amplification circuit having an input terminal coupled to a second terminal of the capacitor, and an output terminal outputting the touch signal.

6. The optical touch module as claimed in claim 5, wherein the amplification circuit comprises:
    an amplifier having a first input terminal, a second input terminal, and an output terminal, wherein the output terminal of the amplifier serves as the output terminal of the amplification circuit, and the second terminal of the amplifier receives a reference voltage;
    a first resistor coupled to the second terminal of the capacitor and the first input terminal of the amplifier, a first terminal of the first resistor serving as the input terminal of the amplification circuit; and
    a second resistor coupled to the first input terminal and the output terminal of the amplifier.

7. The optical touch module as claimed in claim 1, wherein the first voltage is a gate low voltage.

8. An optical touch display panel, comprising:
    a display panel having a pixel array; and
    an optical touch module, comprising:
        a first photo sensor disposed in one of the plurality of pixels of the pixel array, and the first photo sensor has a first terminal and a control terminal coupled to a first scan line;
        a second photo sensor having a first terminal coupled to a second terminal of the first photo sensor and outputting a sensing voltage, a control terminal coupled to the first terminal of the second photo sensor, and a second terminal receiving a first voltage, wherein the sensing voltage is the voltage divided by the first photo sensor and the second photo sensor; and
        a signal processing unit coupled to the first terminal of the second photo sensor for converting the sensing voltage to a touch signal.

9. The optical touch display panel as claimed in claim 8, the optical touch module further comprising a third photo sensor having a first terminal and a control terminal coupled to a second scan line, and a second tenninal coupled to the first terminal of the second photo sensor.

10. The optical touch display panel as claimed in claim 9, wherein the first photo sensor, the second photo sensor, and the third photo sensor are respectively a phototransistor.

11. The optical touch display panel as claimed in claim 9, wherein the second scan line is disposed outside of the pixel array.

12. The optical touch display panel as claimed in claim 8, wherein the signal processing unit comprises:
    a capacitor having a first terminal coupled to the first tenninal of the second photo sensor; and
    an amplification circuit having an input tenninal coupled to a second terminal of the capacitor, and an output terminal outputting the touch signal.

13. The optical touch display panel as claimed in claim 12, wherein the amplification circuit comprises:
    an amplifier having a first input terminal, a second input terminal, and an output terminal, wherein the output terminal of the amplifier serves as the output terminal of the amplification circuit, and the second terminal of the amplifier receives a reference voltage;
    a first resistor coupled to the second terminal of the capacitor and the first input tenninal of the amplifier, a first tenninal of the first resistor serving as the input terminal of the amplification circuit; and
    a second resistor coupled to the first input terminal and the output terminal of the amplifier.

14. The optical touch display panel as claimed in claim 8, wherein the first voltage is a gate low voltage.

* * * * *